(12) United States Patent
Komatsu et al.

(10) Patent No.: US 7,168,832 B2
(45) Date of Patent: Jan. 30, 2007

(54) VEHICLE HEADLAMP

(75) Inventors: Motohiro Komatsu, Shizuoka (JP);
Masao Kinoshita, Shizuoka (JP);
Masahito Naganawa, Shizuoka (JP);
Kenichi Takada, Shizuoka (JP);
Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 80 days.

(21) Appl. No.: 11/063,893

(22) Filed: Feb. 24, 2005

(65) Prior Publication Data

US 2005/0190572 A1 Sep. 1, 2005

(30) Foreign Application Priority Data

Feb. 26, 2004 (JP) .......................... P.2004-052230
Dec. 3, 2004 (JP) .......................... P.2004-350695

(51) Int. Cl.
*F21S 8/10* (2006.01)

(52) U.S. Cl. ............ 362/507; 362/538; 362/328; 362/332; 362/334; 362/335; 362/521; 362/522

(58) Field of Classification Search ............ 362/507, 362/800, 538, 539, 311, 328, 332, 334, 335, 362/520, 521, 522; 359/649–651, 726

See application file for complete search history.

(56) References Cited

U.S. PATENT DOCUMENTS 6,220,736 B1 * 4/2001 Dobler et al. ............ 362/539

FOREIGN PATENT DOCUMENTS

JP    4-39137 A     2/1992
JP    10-223002 A   8/1998

* cited by examiner

*Primary Examiner*—Sandra O'Shea
*Assistant Examiner*—Sharon Payne
(74) *Attorney, Agent, or Firm*—Sughrue Mion, PLLC

(57) ABSTRACT

As the annular translucent member, an annular lens formed from a peripheral edge portion of a convex-meniscus lens is disposed between a projection lens and a reflector along an outer peripheral edge of the projection lens. Direct light from a light source toward a space beyond the outer periphery of the projection lens is caused to illuminate forward of the lamp by the annular lens, thereby effectively utilizing light source luminous flux. In relation to the above, a shape of a back surface of the annular lens is formed into a spherical surface having its center at a luminescence center of the light source. Accordingly, direct light from the light source can travel straight without being deflected by a back surface of the annular lens, whereby a light deflection angle on a front surface of the annular lens can be calculated easily and with good accuracy.

12 Claims, 13 Drawing Sheets

VEHICLE HEADLAMP

This application claims foreign priority under 35 USC 119 based on Japanese Patent Applications No. 2004-52230, filed on Feb. 26, 2004, and No. 2004-350695, filed on Dec. 3, 2004, the contents of which are incorporated herein by references. This priority claims are being made concurrently with the filing of this application.

1. Technical Field

The present invention relates to a projector-type vehicle headlamp.

2. Related Art

A related art vehicle headlamp is generally configured such that a projection lens is disposed on an optical axis extending in a longitudinal direction of a vehicle, a light source is disposed to the rear of a rear focal point of the projection lens, and light from the light source is reflected close to the optical axis by means of a reflector.

In relation to such a projector-type vehicle headlamp, JP-A-4-39137 and JP-A-10-223002 disclose such a lamp configuration that an annular translucent member is disposed between the projection lens and the reflector along an outer peripheral edge of the projection lens.

When a lamp is configured to include the annular translucent member as disclosed in JP-A-4-39137 and JP-A-10-223002, direct light from the light source toward the space beyond the outer periphery of the projection lens is allowed to illuminate forward of the lamp, thereby enabling effective utilization of light source luminous flux.

However, in the vehicle headlamp disclosed in JP-A-4-39137 and JP-A-10-223002, the back surface of the annular translucent member is formed as a conical surface. Accordingly, the following related art problem arises.

Direct light emitted from the light source and incident to the back surface of the annular translucent member is in the form of diverging rays centered at the light source. Accordingly, an angle-of-incidence of the direct light varies depending on the incident position, thereby complicating calculation of a light deflection angle for causing direct light emitted from the light source and having passed through the annular translucent member to exit in a desired direction from the front surface of the annular translucent member. As a result, there arises a related art problem in that the light deflection angle cannot be substantially accurately controlled.

SUMMARY OF THE INVENTION

The present invention has been conceived in view of the above circumstances and has as an object providing a projector-type vehicle headlamp which includes an annular translucent member in an attempt to effectively utilize light source luminous flux and which can perform light deflection control by use of the annular translucent member easily and with good accuracy. However, the present invention need not achieve this object, and may achieve other object or no objects at all.

The invention includes means of configuring the annular translucent member as an annular lens formed from a peripheral edge portion of a convex-meniscus lens and by means of making contrivance to the back surface shape of the member.

A vehicle headlamp according to the invention is a vehicle headlamp having a projection lens disposed on an optical axis extending in a longitudinal direction of a vehicle, a light source disposed to the rear of a rear focal point of the projection lens, and a reflector for reflecting light from the light source forward and close to the optical axis, and is characterized by the following. An annular lens formed from a peripheral edge portion of a convex-meniscus lens is disposed between the projection lens and the reflector on at least a portion of an outer peripheral edge of the projection lens, and a shape of a back surface of the annular lens is formed into a substantially spherical surface having its center in the vicinity of the light source.

No specific restriction is imposed on a type of the light source. For example but not by way of limitation, a light-emitting section of a discharge bulb or a halogen bulb, or a light-emitting chip of a light-emitting element, such as a light-emitting diode, can be employed. In addition, no specific restriction is imposed on a specific location and orientation of the light source, so long as the light source is disposed to the rear of the rear focal point of the projection lens; for instance, the light source may be located either on the optical axis or at a position offset from the optical axis.

No particular restriction is imposed on the annular lens with regard to a specific configuration, such as a material, a radial width, and a shape of the front surface, so long as the annular lens is formed from a peripheral edge portion of a convex-meniscus lens, and a shape of the back surface is formed into a substantially spherical surface having its center in the vicinity of the light source. In relation to the above, a curved surface constituting the above-mentioned substantially spherical surface may be, as a matter of course, a complete spherical surface. Alternatively, the curved surface may be a spheroid whose first focal point is a point in the vicinity of the light source and whose second focal point is another point in the vicinity of the light source, or the like. In addition, as a matter of course, the annular lens may be formed over the entire circumference with respect to the optical axis. However, the annular lens may be formed with a void over a portion of the circumference.

As described in the above configuration, the vehicle headlamp according to the present invention is configured as a projector-type vehicle headlamp. However, the annular lens, formed from a peripheral edge portion of a convex-meniscus lens, is disposed between the projection lens and the reflector over at least a portion of the outer peripheral edge of the projection lens. Accordingly, direct light from the light source toward the space beyond the outer periphery of the projection lens can be caused to illuminate forward of the lamp by means of the annular lens, thereby enabling effective utilization of light source luminous flux. As a result, an additional light distribution pattern formed from direct light emitted from the light source and having passed through the annular lens is added to a basic light distribution pattern formed from light emitted from the light source, reflected by the reflector, and having passed through the projection lens, thereby enabling an increase in brightness of a light distribution pattern.

In relation to the above, the shape of the back surface of the annular lens is formed into a spherical surface having its center in the vicinity of the light source. Accordingly, direct light from the light source can be caused to travel straight without undergoing essential refraction on the back surface of the annular lens. Consequently, a light deflection angle for causing direct light emitted from the light source and having reached the front surface to exit in a desired direction can be calculated easily and with good accuracy.

As described above, in the projector-type vehicle headlamp according to the invention, by virtue of disposing the annular lens serving as an annular translucent member, light source luminous flux can be effectively utilized, and light deflection control with use of the annular lens can be performed easily and with good accuracy.

In the above configuration, when a cross-sectional profile of the front surface of the annular lens through the optical axis is formed into a uniform curve around the entire periphery of the annular lens so as to cause direct light emitted from the light source and having reached the front surface to exit as substantially parallel light along the optical axis Ax, the additional light distribution pattern can be formed as a spot-like light distribution pattern ahead of the lamp.

In the above configuration, when a shade for shielding some of reflected light from the reflector is disposed in the vicinity of a rear focal point of the projection lens in such a manner that an upper edge of the shade is located in the vicinity of the optical axis, a low-beam light distribution pattern having cutoff lines on its upper edge can be formed; however, when such a configuration is employed, some of light source luminous flux is lost by the presence of the shade. Therefore, effective utilization of the remaining light source luminous flux by means of adopting the configuration of the invention is particularly effective for ensuring sufficient brightness of the low-beam light distribution pattern.

Furthermore, when such a configuration is adopted, the following working-effects can be obtained.

That is, generally, in a projector-type lamp unit configured to illuminate light for forming a low-beam light distribution pattern, the following concern may arise. When forward-illuminated light from a vehicle shines directly in the eyes of the driver of an oncoming vehicle or others as a result of a vehicle changing its spatial orientation or the like, only a projection lens portion of the light appears to glow with high intensity, whereby the oncoming driver or others experiences glare. In contrast, when an annular lens is disposed on the periphery of the projection lens, in a case where forward-illuminated light shines directly in the eyes of the driver of an oncoming or others, a peripheral portion of the projection lens can be caused to appear relatively dim. Accordingly, contrast in brightness between the projection lens and the peripheral portion thereof can be decreased, thereby enabling a reduction in glare experienced by the driver of the oncoming vehicle or others.

In this case, when a cross-sectional profile of the front surface of the annular lens through the optical axis is formed into a curve whose shape varies depending on its circumferential position to thus cause direct light emitted from the light source and having reached the front surface to exit as light oriented downward with respect to the optical axis, the additional light distribution pattern can be formed to not extend above the cut-off line of the low-beam light distribution pattern. By virtue of the above, occurrence of glare as a result of providing the annular lens can be substantially reduced.

Alternatively, direct light from the annular lens can be easily caused to exit as light oriented downward with respect to the optical axis by means of: setting a shape of aback surface of an upper half section of the annular lens to a substantially spherical surface having its center ahead and in the vicinity of the light source; and that of a lower half section to a substantially spherical surface having its center in the rear and the vicinity of the light source.

In these cases, when there is employed a configuration wherein an upward-illuminating lens section is formed for causing direct light to exit the light source as light oriented upward with respect to the optical axis on an upper portion of the projection lens of the annular lens, an overhead-sign-illuminating distribution pattern for illuminating an overhead sign located on the road ahead of the vehicle can be formed from upward-illuminating light from the upward-illuminating lens section. In relation to the above, no particular restriction is imposed on a specific configuration of the upward-illuminating lens section, so long as the upward-illuminating lens section is formed so as to cause direct light from the light source to exit as light oriented upward with respect to the optical axis.

In relation to the above configuration, when the annular lens is split into two halves consisting of an upper half section and a lower half section, assembly of the annular lens can be facilitated. In particular, also when the annular lens is constituted of the upper half section and the lower half section, which differ in shape, manufacture of the annular lens is facilitated.

DETAILED DESCRIPTION OF THE INVENTION

Embodiments of the invention will be described hereinbelow by reference to the drawings.

Figure 1:
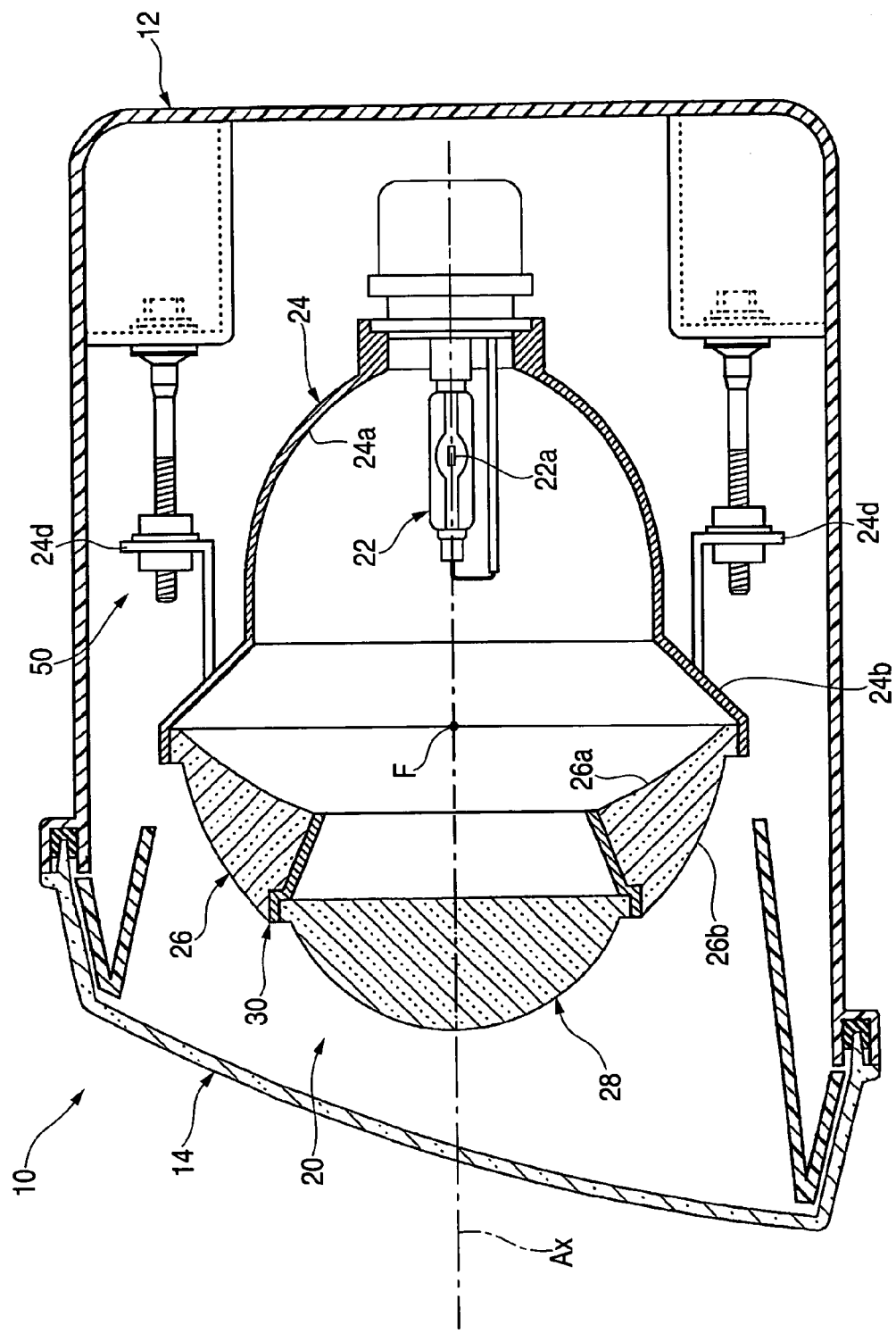
FIG. 1 is a side cross-sectional view showing a vehicle headlamp according to a first exemplary, non-limiting embodiment of the present invention.

First, a first exemplary, non-limiting embodiment of the present invention will be described. FIG. 1 is a side cross-sectional view showing a vehicle headlamp 10. The vehicle headlamp 10 is configured such that a lamp unit 20 having an optical axis Ax extending in a longitudinal direction of the vehicle is housed within a lamp chamber to allow tilt in a vertical direction and in a lateral direction by way of an aiming mechanism 50. The lamp chamber is formed from a lamp body 12, and a clear or translucent cover 14 disposed at a front end opening of the lamp body 12.

The lamp unit 20 is configured such that, after completion of aiming control by means of the aiming mechanism 50, the optical axis Ax of the lamp unit 20 extends in the longitudinal direction of the vehicle.

Figure 2:
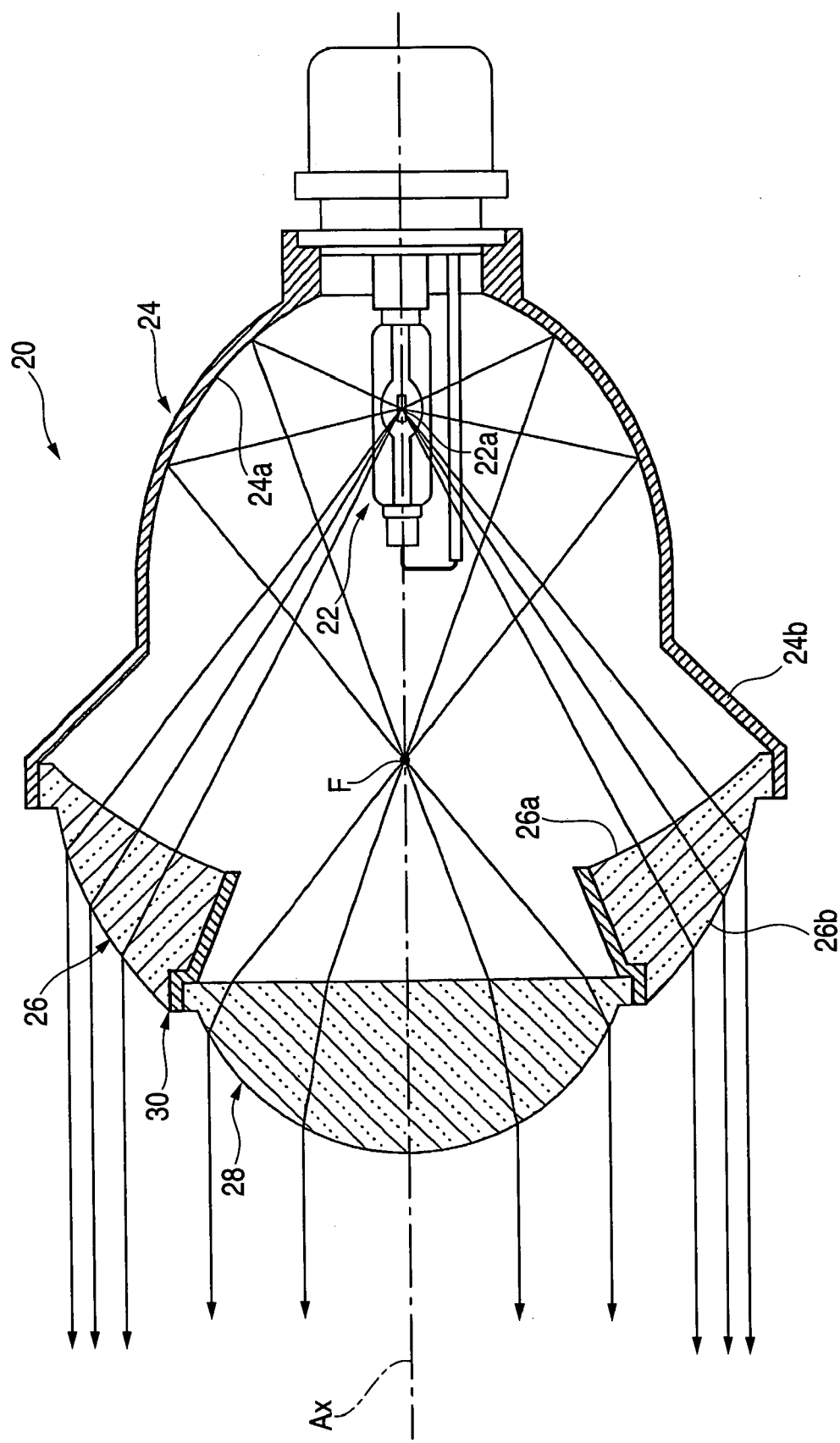
FIG. 2 is a side cross-sectional view showing a lamp unit of the vehicle headlamp as a single article according to the first exemplary, non-limiting embodiment of the present invention.
Figure 3:
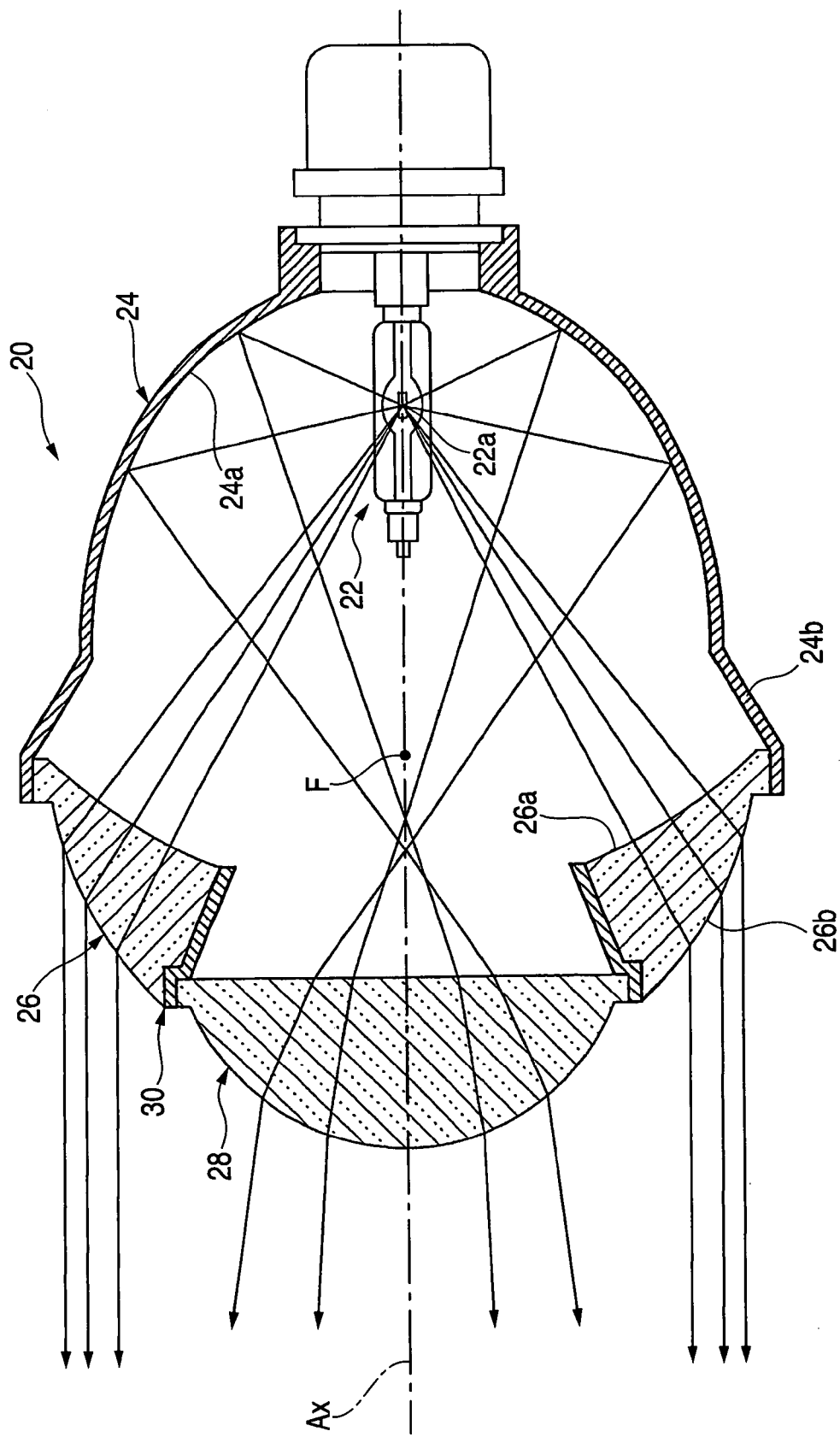
FIG. 3 is a plan cross-sectional view showing the lamp unit as a single article according to the first exemplary, non-limiting embodiment of the present invention.
Figure 4:
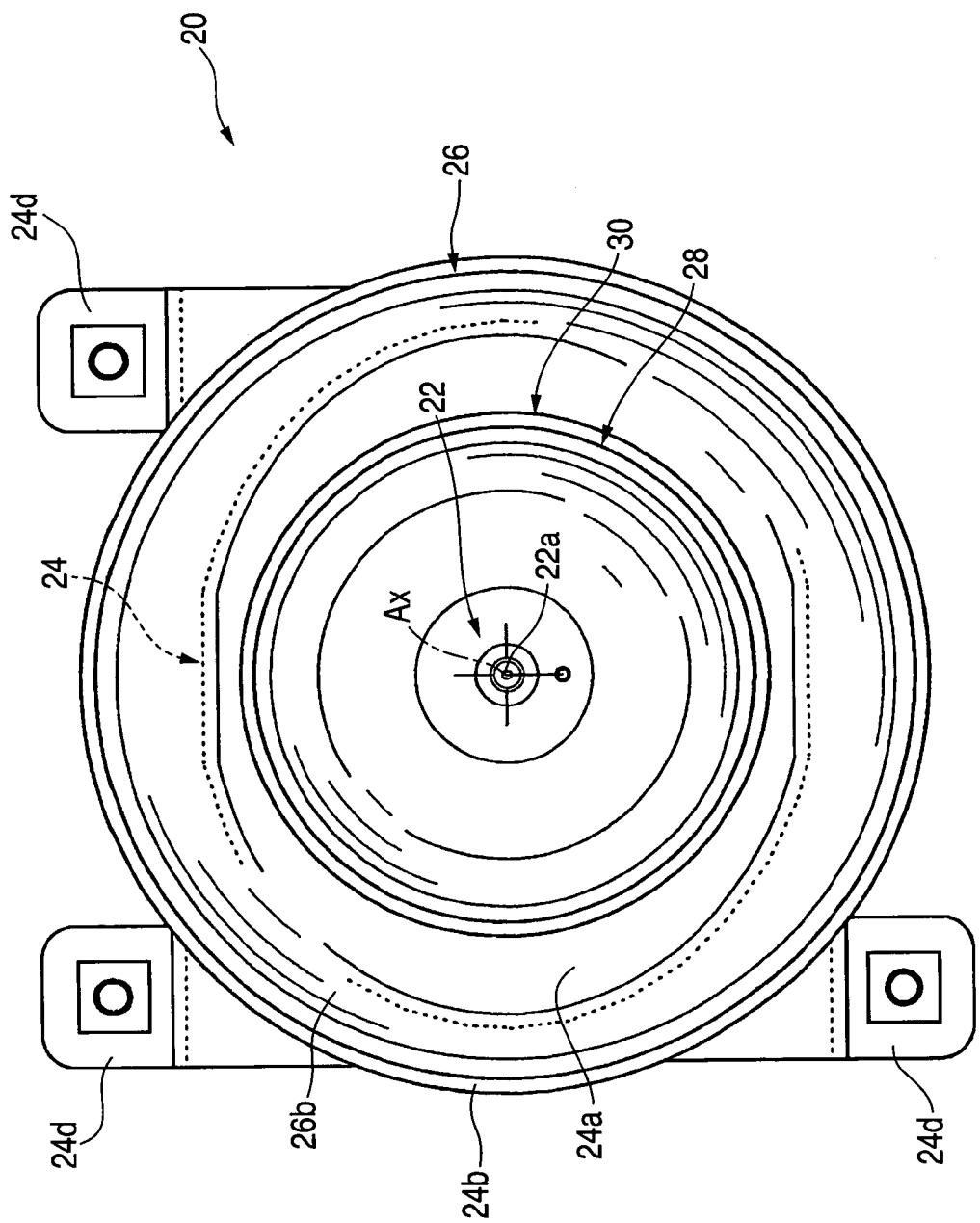
FIG. 4 is a front view showing the lamp unit as a single article according to the first exemplary, non-limiting embodiment of the present invention.

FIG. 2 is a side cross-sectional view showing the lamp unit 20 as a single article; FIG. 3 is a plan cross-sectional view showing the same; and FIG. 4 is a front view showing the same.

The lamp unit 20 is a projector-type lamp unit configured to illuminate light for forming a high-beam light distribution pattern, and comprises a light source bulb 22, a reflector 24, an annular lens 26, a projection lens 28, and a holder 30.

The projection lens 28 is formed from a plano-convex lens having a convex surface serving as the front surface and a plane surface as the back surface, and is disposed on the optical axis Ax. The projection lens 28 is configured such that an image on a focal plane including a rear focal point F is projected forward as a reversed image thereof. An outer peripheral edge of the projection lens 28 is fixedly supported on the holder 30. The holder 30 is formed from a substantially cylindrical member whose diameter is tapered-down rearward.

The light source bulb 22 is a discharge lamp, such as a metal halide bulb, which employs a discharge light-emitting section as a light source 22a, and is attached to a rear end portion of the reflector 24 while being inserted thereinto. The light source 22a is configured as a linear light source extending on the optical axis Ax.

The reflector 24 has a reflection surface 24a for reflecting light from the light source bulb 22 forward and close to the optical axis Ax. The reflection surface 24a has a substantially elliptic cross-sectional profile, and is configured such that the eccentricity of the ellipse gradually increases from a vertical cross section toward a horizontal cross section. By virtue of the above configuration, light emitted from the light source 22a and reflected from the reflection surface 24a converges at the rear focal point F within the vertical cross sectional plane, and the conversion point is displaced forward of the rear focal point F in the horizontal cross sectional plane. The reflector 24 is supported by the lamp body 12 by way of the aiming mechanism 50 at aiming brackets 24d formed at three points on the reflector 24.

The annular lens 26 is formed from a peripheral edge portion of a convex-meniscus lens, and disposed between the projection lens 28 and the reflector 24 along the outer peripheral edge of the projection lens 28, around the entire circumference thereof. In this configuration, the inner peripheral edge of the annular lens 26 is fixedly supported on the holder 30, and the outer peripheral edge of the annular lens 26 is fixedly supported on the reflector 24. To implement the configuration, an annular flange 24b for supporting the annular lens 26 is formed on a front-end opening of the reflector 24.

The shape of a back surface 26a of the annular lens 26 is formed into a spherical surface having its center at a luminescence center of the light source 22a. In addition, the cross-sectional profile of a front surface 26b of the annular lens 26 through the optical axis Ax is formed into a uniform curve around the entire circumference of the annular lens 26 to cause direct light emitted from the light source 22a and having reached the front surface 26b to exit as substantially parallel light along the optical axis Ax.

Figure 5:
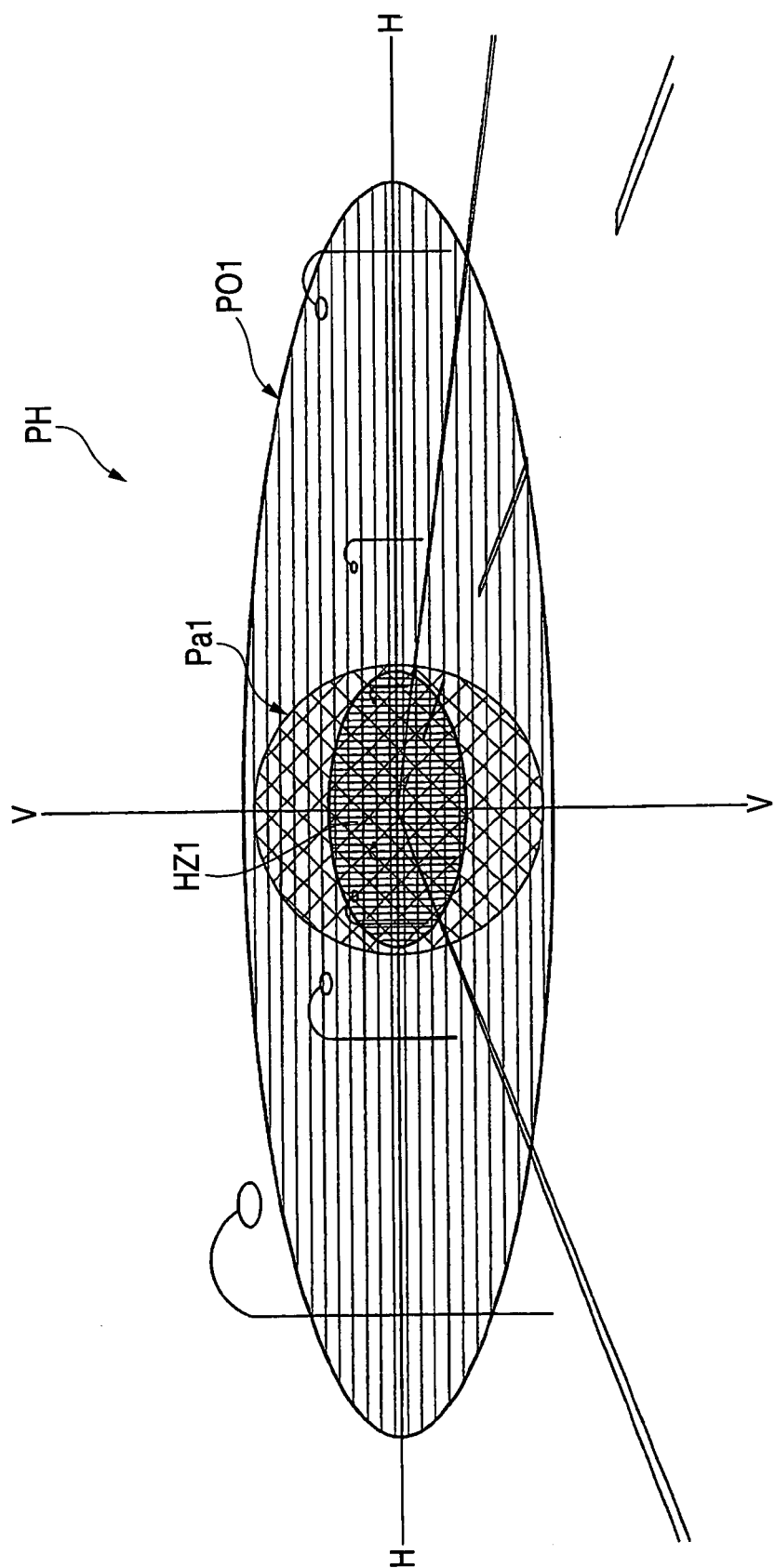
FIG. 5 is a perspective view showing a light distribution pattern formed from light illuminated forward from the lamp unit of the vehicle headlamp on a virtual vertical screen.

FIG. 5 is a perspective view showing a high-beam light distribution pattern PH formed on a virtual vertical screen placed about 25 m a head of the lamp, by means of light illuminated forward from the lamp unit 20 of the first embodiment.

The high-beam light distribution pattern PH is formed as a composite light distribution pattern consisting of a basic light distribution pattern P01 and an additional light distribution pattern Pa1.

The basic light distribution pattern P01 is a light distribution pattern formed from light emitted from the light source 22a, reflected from the reflector 24, and having passed through the projection lens 28, and is formed as a horizontally-elongated light distribution pattern widely extending in the horizontal direction with respect to a point H-V, which corresponds to a vanishing point ahead of the lamp. Accordingly, a hot zone HZ1, which is a high-intensity region, is formed so as to surround the point H-V.

The additional light distribution pattern Pa1 is a light distribution pattern formed from direct light emitted from the light source 22a and having passed through the annular lens 26. The additional light distribution pattern Pa1 is configured as a spot-like circular light distribution pattern having its center at the point H-V.

As detailed above, the vehicle headlamp 10 is configured such that the lamp unit 20 is a projector-type lamp unit that illuminates light for forming the high-beam light distribution pattern PH. The annular lens 26, formed from a peripheral edge portion of a convex-meniscus lens, is disposed between the projection lens 28 and the reflector 24 along the outer peripheral edge of the projection lens 28. Accordingly, direct light from the light source 22a toward the space beyond the outer periphery of the projection lens 28 can be caused to illuminate forward of the lamp by means of the annular lens 26, thereby enabling effective utilization of light source luminous flux. By virtue of the above configuration, brightness of the high-beam light distribution pattern PH can be enhanced when the additional light distribution pattern Pa1—formed from direct light emitted from the light source 22a and having passed through the annular lens 26—is added to the basic light distribution pattern P01—formed from light illuminated from the light source 22a, reflected from the reflector 24, and having passed through the projection lens 28.

In relation to the above, the shape of the back surface of the annular lens 26 is a substantially spherical surface having its center at the luminescence center of the light source 22a. Accordingly, direct light from the light source 22a can be caused to travel straight without undergoing essential refraction on the back surface 26a of the annular lens 26. Consequently, a light deflection angle for causing direct light emitted from the light source and having reached the front surface 26b to exit as substantially parallel light along the optical axis Ax can be calculated easily and with substantially high accuracy.

As described above, by virtue of disposing the annular lens 26 serving as an annular translucent member in the projector-type lamp unit 20, light source luminous flux can be effectively utilized, and light deflection control by use of the annular lens 26 can be performed easily and with good accuracy.

In particular, the cross-sectional profile of the front surface 26b of the annular lens 26 through the optical axis Ax is a uniform curve around the entire circumference of the annular lens 26, so as to cause direct light emitted from the light source 22a and having reached the front surface 26b to exit as substantially parallel light along the optical axis Ax.

Accordingly, the additional light distribution pattern Pa1 can be formed as a spot-like light distribution pattern a head of the lamp. As a result, the high-beam light distribution pattern PH can be enhanced in terms of the distant visibility of the road along which the vehicle drives.

In addition, the holder 30 is disposed between the projection lens 28 and the annular lens 26. Accordingly, incidence of direct light from the light source 22a into the annular lens 26 as stray light is prevented.

The first embodiment has been described on an assumption that the cross-sectional profile of the front surface 26b of the annular lens 26 through the optical axis Ax is formed into a uniform curve around the entire circumference of the annular lens 26. However, substantially the same working effects as those of the first embodiment can be obtained, so long as its cross sectional profile is formed into a substantially uniform curve around the entire circumference of the annular lens 26.

In addition, the first embodiment has been described on an assumption that the shape of the back surface of the annular lens 26 is a substantially spherical surface having its center at the luminescence center of the light source 22a. However, substantially the same working effects as those of the first embodiment can be obtained, so long as the shape of the back surface of the annular lens 26 is formed into a curved surface which closely approximates that of the first embodiment.

Furthermore, the first embodiment has been described on an assumption that the holder 30 is disposed between the projection lens 28 and the annular lens 26. However, a configuration in which the projection lens 28 and the annular lens 26 are directly fixed to each other can also be adopted.

Figure 6:
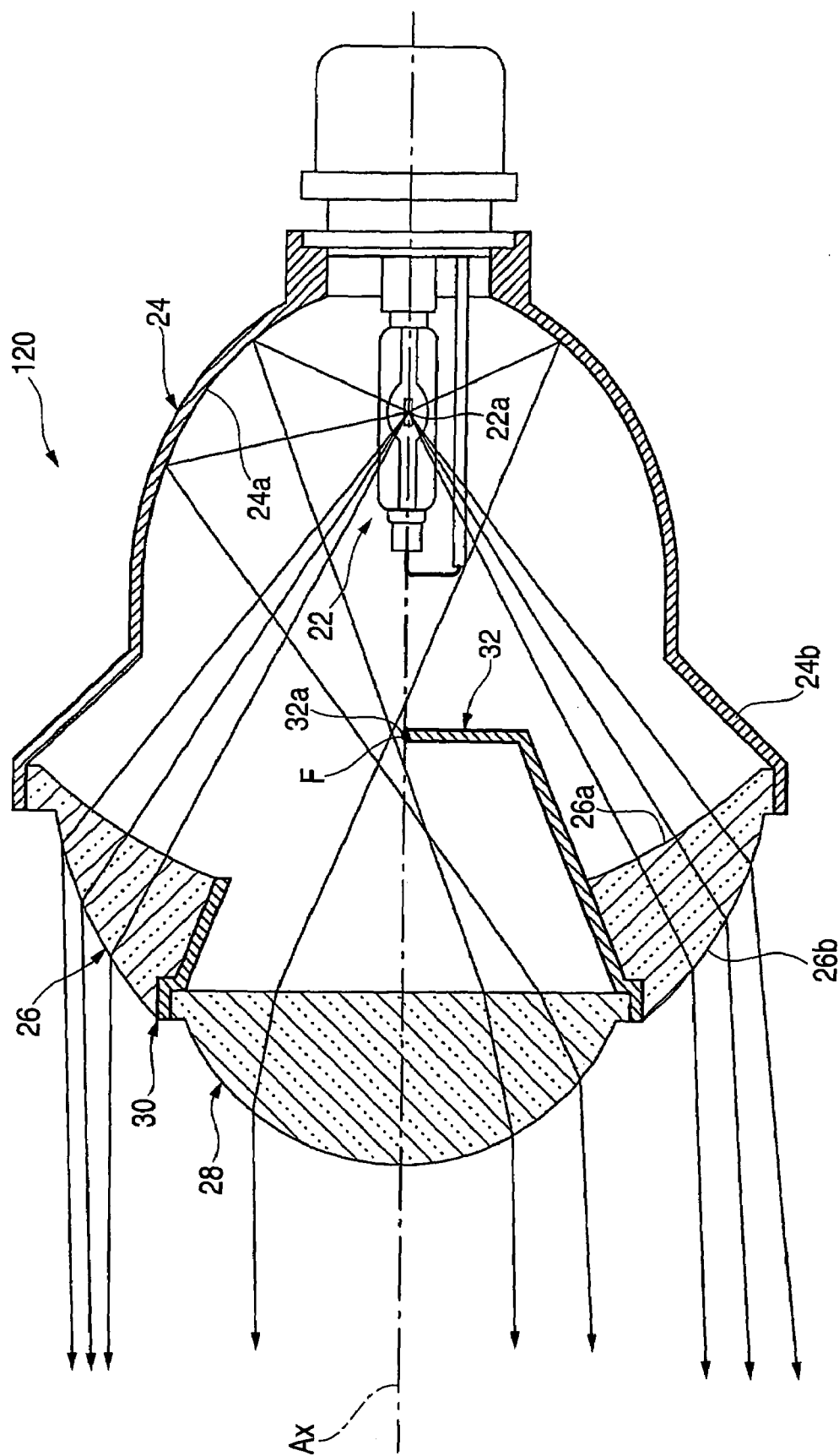
FIG. 6 is a side cross-sectional view showing a lamp unit of a vehicle headlamp according to a second exemplary, non-limiting embodiment of the present invention as a single article.
Figure 7:
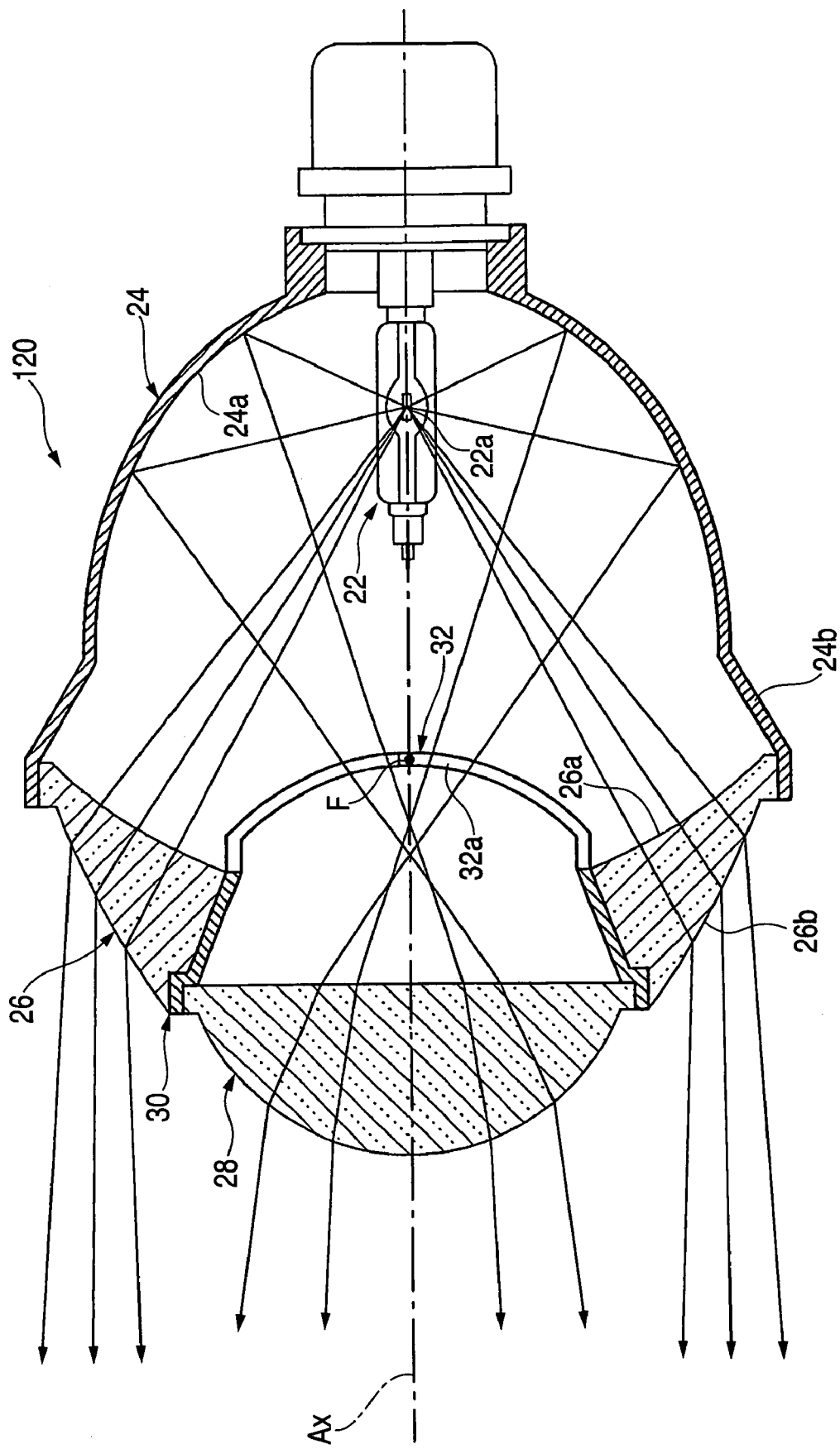
FIG. 7 is a plan cross-sectional view showing the lamp unit shown in FIG. 6 as a single article according to the second exemplary, non-limiting embodiment of the present invention.

Next, a second exemplary, non-limiting embodiment of the present invention will be described. FIG. 6 is a side cross-sectional view showing a lamp unit 120 of a vehicle headlamp according to the second embodiment as a single article. FIG. 7 is a plan cross-sectional view showing the same.

The lamp unit 120 is a projector-type lamp unit configured to illuminate light for forming a low-beam light distribution pattern, and has a basic structure analogous to that of the first embodiment. However, the lamp unit differs from that of the first embodiment in that a shade 32 is added, and also in a focal length of the projection lens 28, a shape of the reflection surface of the reflector 24, and a shape of the front surface of the annular lens 26.

The shade 32 of the present embodiment is formed integrally with the holder 30 so as to extend rearward from a substantially lower half section of the holder 30. The shade 32 is formed such that an upper edge 32a thereof passes through the rear focal point F of the projection lens 28. Accordingly, some of light reflected from the reflection surface 24a of the reflector 24 is shielded, thereby removing most of upward light exiting forward from the projection lens 28. In relation to the above, the upper edge 32a of the shade 32 extends horizontally as a substantially arc shape along a rear focal plane of the projection lens 28 such that the right-side and left-side of the edge differ from each other in level. Furthermore, the shade 32 is formed so as not to shield direct light from the light source 22a toward the annular lens 26.

The focal length of the projection lens 28 of the second embodiment is formed into a value slightly larger than that of the first embodiment. In addition, a curvature of the vertical cross-sectional profile of the reflection surface 24a of the reflector 24 of the second embodiment differs slightly from that of the first embodiment. As a result, that light emitted from the light source 22a and reflected from the reflection surface 24a is substantially converged in the vicinity of the rear focal point F in the vertical cross-sectional plane. In the second embodiment, the lamp unit 120 is configured such that, after completion of aiming control, the optical axis Ax extends in a direction oriented approximately 0.5 to 0.6° downward with respect to the longitudinal direction of the vehicle.

The annular lens 26 of the second embodiment is set such that the cross-sectional profile of the front surface 26b through the optical axis Ax varies depending on its circumferential position. Accordingly, direct light emitted from the light source 22a and having reached the front surface 26b is caused to emit as light oriented downward with respect to the optical axis Ax. More specifically, the annular lens 26 is set such that the light deflection angle assumes its highest value at the upper region located directly above the optical axis Ax, its lowest value at the lower region located directly under the optical axis Ax, and intermediate values at lateral regions located to the left and right sides of the optical axis Ax.

In addition, the front surface 26b of the annular lens 26 is set such that the curvature of a curve constituting the cross-sectional profile through the optical axis Ax slightly higher in the upper region as compared with that of the first embodiment, slightly lower in the lower region as compared with the first embodiment, and considerably lower in the lateral regions as compared with the first embodiment. Accordingly, the light having exited from the front surface 26b is caused to converge at a certain distance in the vertical direction and thereafter slightly diffuse in the vertical direction in the upper region; in the lower region, to slightly diffuse in the vertical direction; and, in the lateral regions, to diffuse in the lateral direction to some extent.

Figure 8:
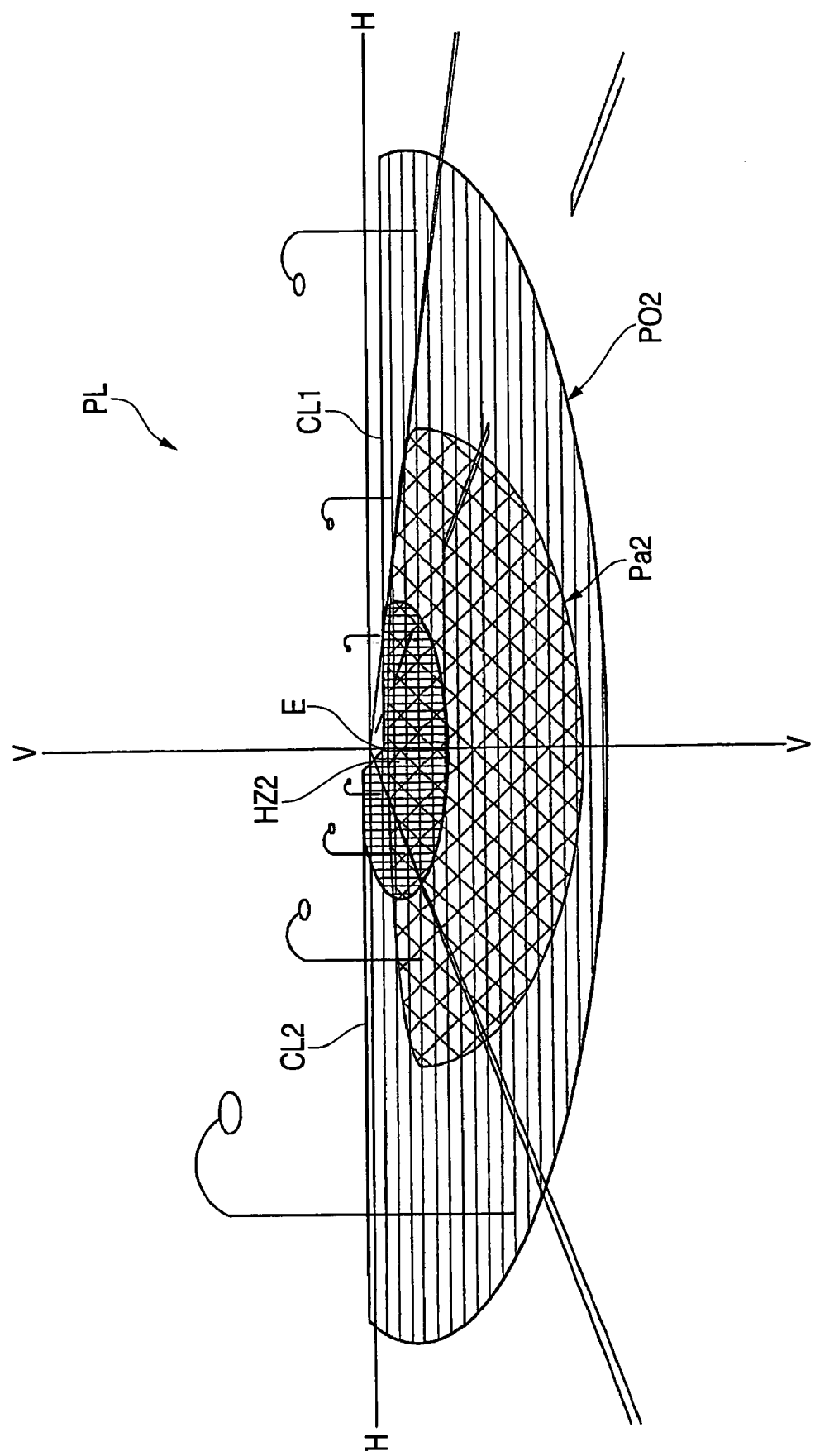
FIG. 8 is a perspective view showing a light distribution pattern formed from light illuminated forward from the lamp unit shown in FIG. 6 on the virtual vertical screen, according to the second exemplary, non-limiting embodiment of the present invention.

FIG. 8 is a perspective view showing a low-beam light distribution pattern PL formed from light illuminated forward from the lamp unit 120 of the present embodiment on the virtual vertical screen. The low-beam light distribution pattern PL is a left-oriented low-beam light distribution pattern and is formed as a composite light distribution pattern consisting of a basic light distribution pattern P02 and an additional light distribution pattern Pa2.

The basic light distribution pattern P02 is a light distribution pattern formed from light emitted from the light source 22a, reflected by the reflector 24, and having passed through the projection lens 28. The pattern P02 has, at an upper edge thereof, cutoff lines CL1 and CL2 which differ in level on the right and the left sides thereof and which are formed as reverse projection images of the upper edge 32a of the shade 32. The cutoff lines CL1 and CL2 extend horizontally so as to differ in height on the right and the left sides with a line V—V vertically passing through the point H-V therebetween. Of the cutoff lines, the portion to the right of the line V—V and corresponding to the opposite lane is formed as the lower cutoff line CL1, and the portion on the left of the line V—V and corresponding to the vehicle's own lane is formed as the upper cutoff line CL2. The upper cutoff line CL2 is stepped-ascended from the lower cutoff line CL1 with a tilted section therebetween. In the low-beam light distribution pattern PL, a position of an elbow point E, which is an intersection of the lower cutoff line CL1 and the line V—V, is formed into a location situated about 0.5 to 0.6° below the point H-V; and a hot zone HZ2, which is a high-intensity region, is formed so as to surround the elbow point E.

The additional light distribution pattern Pa2 is a light distribution pattern formed from direct light emitted from the light source 22a and having passed through the annular lens 26, and is configured as an oblate and substantially semicircular light distribution pattern which is diffused to the left and right sides of the line V—V at a certain diffusion angle and with the elbow point E as its center. In relation to the above, the additional light distribution pattern Pa2 is formed such that the upper edge thereof is located slightly below the lower cutoff line CL1.

Also in the lamp unit 120 of the second embodiment, the annular lens 26, formed from a peripheral edge portion of a convex-meniscus lens, is disposed between the projection lens 28 and the reflector 24 along the outer peripheral edge of the projection lens 28. Accordingly, direct light from the light source 22a toward the space beyond the outer periphery of the projection lens 28 can be caused to illuminate forward of the lamp by means of the annular lens 26, thereby enabling effective utilization of light source luminous flux. As a result, with the addition of the additional light distribution pattern Pa2—formed from direct light emitted from the light source 22a and having passed through the annular lens 26—is added to the basic light distribution pattern P02—formed from light emitted from the light source 22a, reflected from the reflector 24, and having passed through the projection lens 28—brightness of the low-beam light distribution pattern PL can be substantially enhanced.

In relation to the above, the back surface of the annular lens 26 is formed into a substantially spherical surface having its center at the luminescence center of the light source 22a. Accordingly, direct light from the light source 22a can be caused to travel straight without being deflected on the back surface 26a of the annular lens 26, whereby a light deflection angle on the front surface 26b of the annular lens 26 can be calculated easily and with good accuracy.

In the second embodiment, the cross-sectional profile of the front surface 26b of the annular lens 26 through the optical axis Ax is formed into a curve whose shape varies depending on its circumferential position to thus cause direct light emitted from the light source 22a and having reached the front surface 26b to exit as light oriented downward with respect to the optical axis Ax. Therefore, the additional light distribution pattern Pa2 can be formed so as not to extend above the cut-off lines CL1, CL2 of the low-beam light distribution pattern PL. By virtue of the above configuration, occurrence of glare as a result of providing the annular lens can be substantially prevented.

In addition, when a configuration for forming the low-beam light distribution pattern PL is employed as in the case of the lamp unit 120 according to the second embodiment, some of light source luminous flux is lost by the presence of the shade 32. Accordingly, effective utilization of the remaining light source luminous flux as in the second embodiment is particularly advantageous for ensuring sufficient brightness of the low-beam light distribution pattern PL.

Furthermore, when the configuration of the second embodiment is adopted, the following working-effects can be obtained.

In a projector-type lamp unit configured to illuminate light for forming a low-beam light distribution pattern, the following concern may arise. When forward-illuminated light from a vehicle shines directly into the eyes of the driver of an oncoming driver vehicle or others as a result of a vehicle changing its spatial orientation or the like, only a projection lens portion of the light appears to glow with high intensity. As a result, the driver of the oncoming vehicle or others experience glare.

In contrast, when the annular lens 26 is disposed on the periphery of the projection lens 28, and when forward-illuminated light shines directly on the eyes of the driver of an oncoming vehicle or others, a peripheral portion of the projection lens 28 can appear relatively dim. Accordingly, contrast in brightness between the projection lens 28 and the peripheral portion thereof can be decreased, thereby enabling a substantial reduction in glare experienced by the driver of the oncoming vehicle or others.

In relation to the above, when light diffusion processing (such as formation of a plurality of diffusion lens elements or embossing) is applied on the front surface 26b of the annular lens 26 to cause light having exited from the annular lens 26 to diffuse, the amount of light having exited therefrom can be made uniform between the respective directions. As a result, visibility provided by the annular lens 26 can be enhanced.

Figure 9:
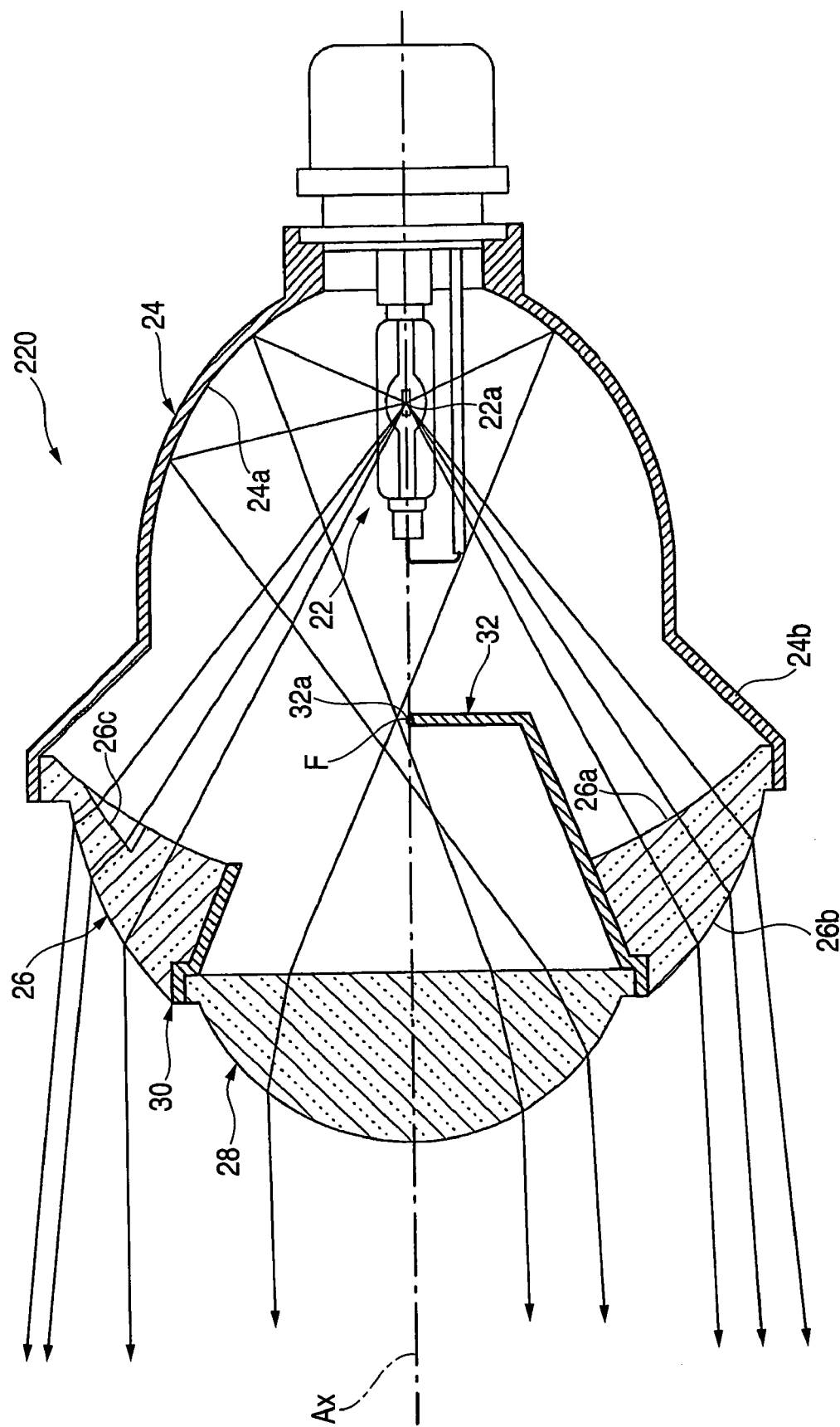
FIG. 9 is a side cross-sectional view showing a lamp unit of a vehicle headlamp according to a third exemplary, non-limiting embodiment of the present invention as a single article.

Next, a third exemplary, non-limiting embodiment of the present invention will be described. FIG. 9 is a side cross-sectional view showing a lamp unit 220 of a vehicle headlamp according to the third embodiment.

The lamp unit 220 has a basic structure analogous to that of the second embodiment. However, the lamp unit differs from that of the second embodiment in the configuration of the annular lens 26.

More specifically, an upward-illuminating lens section 26c for orienting direct light from the light source 22a upward with respect to the optical axis Ax is formed on an upper portion of the projection lens 28 of the annular lens 26. The upward-illuminating lens section 26c is formed by partially notching the back surface 26a of the annular lens in a wedge shape. The upward-illuminating lens section 26c partially decreases an optical deflecting effect of the annular lens 26, thereby orienting slightly upward some of light having exited from the front surface 26b of the annular lens 26.

Figure 10:
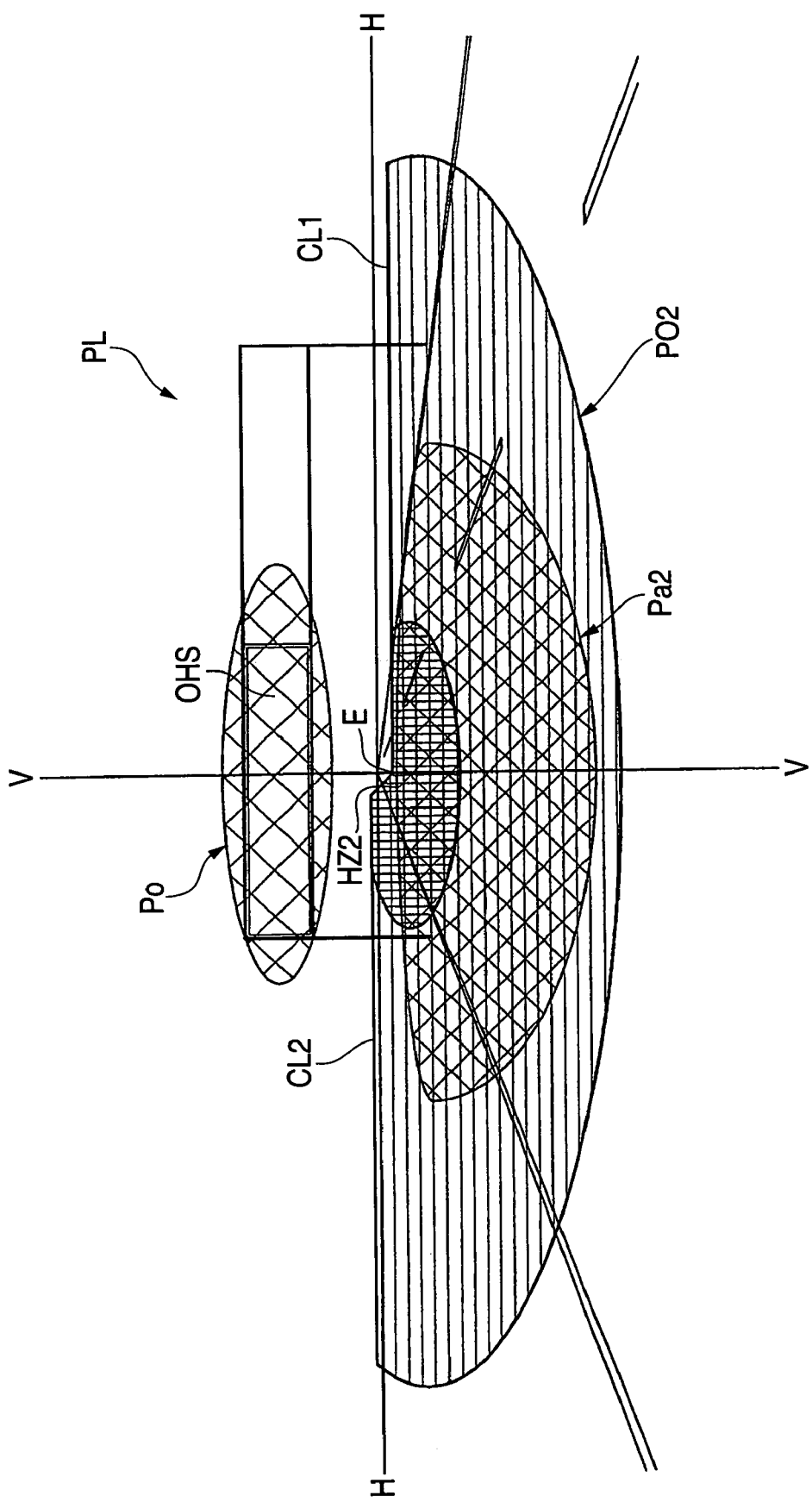
FIG. 10 is a perspective view showing a light distribution pattern formed from light illuminated forward from the lamp unit shown in FIG. 9 on the virtual vertical screen, according to the third exemplary, non-limiting embodiment of the present invention.

FIG. 10 is a perspective view showing the low-beam light distribution pattern PL formed from light illuminated forward from the lamp unit 220 of the third embodiment on the virtual vertical screen.

The low-beam light distribution pattern PL is analogous to that of the second embodiment with regard to the basic light distribution pattern P02. However, a portion of the additional light distribution pattern Pa2 is formed as an overhead-sign-illuminating light distribution pattern Po. By virtue of formation of the overhead-sign-illuminating light distribution pattern Po, an overhead sign (hereinafter, sometimes referred to as an "OHS") of a road ahead of the vehicle is illuminated, thereby ensuring the visibility of the OHS.

As described above, when the configuration of the present embodiment is adopted, visibility of an OHS can be ensured by virtue of formation of the overhead-sign-illuminating light distribution pattern Po, while substantially the same working effects as in the second embodiment are ensured.

Furthermore, since the upward-illuminating lens section 26c is formed by partially notching the back surface 26a of the annular lens in a wedge shape, the overhead-sign-illuminating light distribution pattern Po can be formed without impairing the appearance of the annular lens 26.

Figure 11:
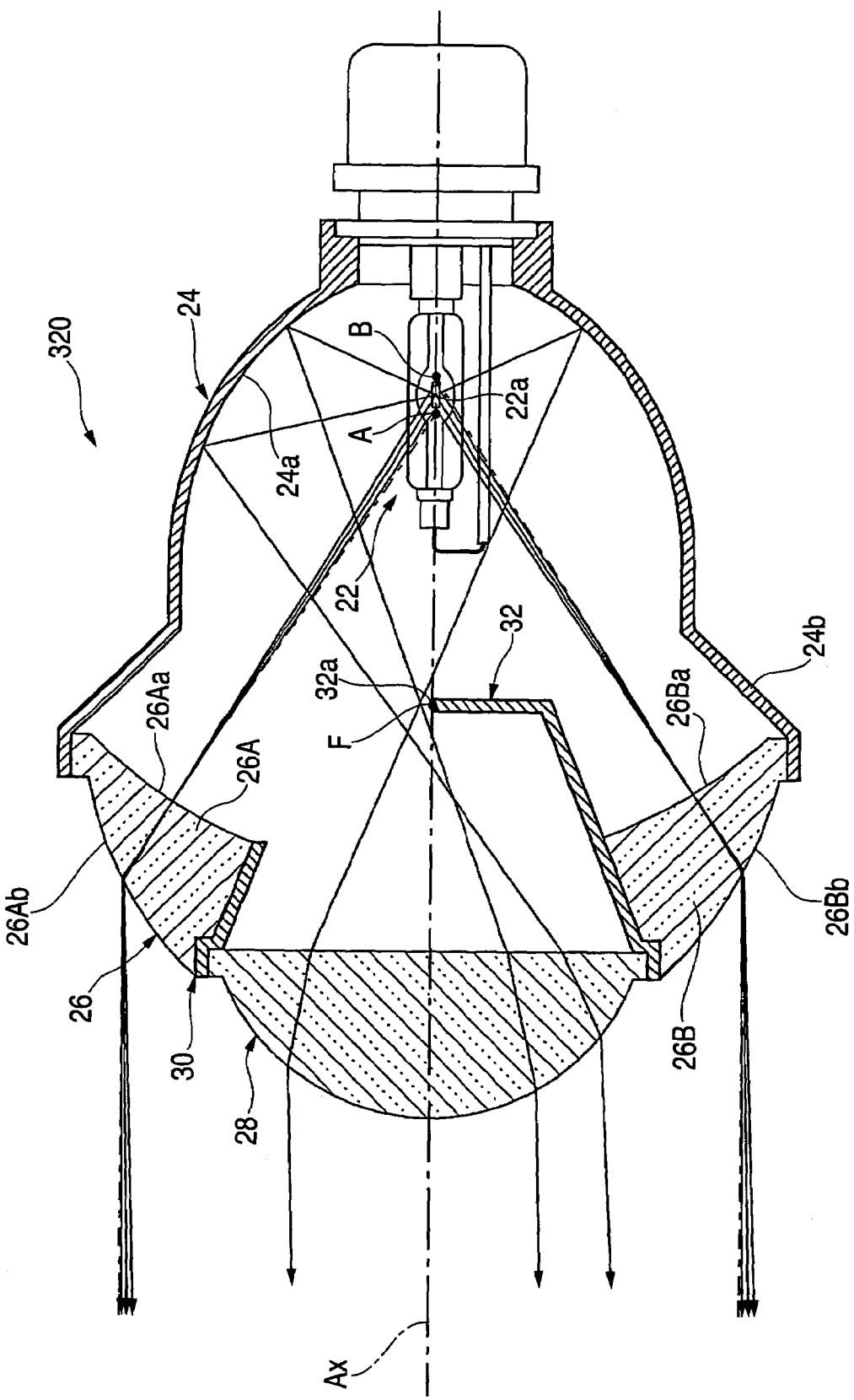
FIG. 11 is a side cross-sectional view showing a lamp unit of a vehicle headlamp according to a fourth exemplary, non-limiting embodiment of the present invention as a single article.
Figure 12:
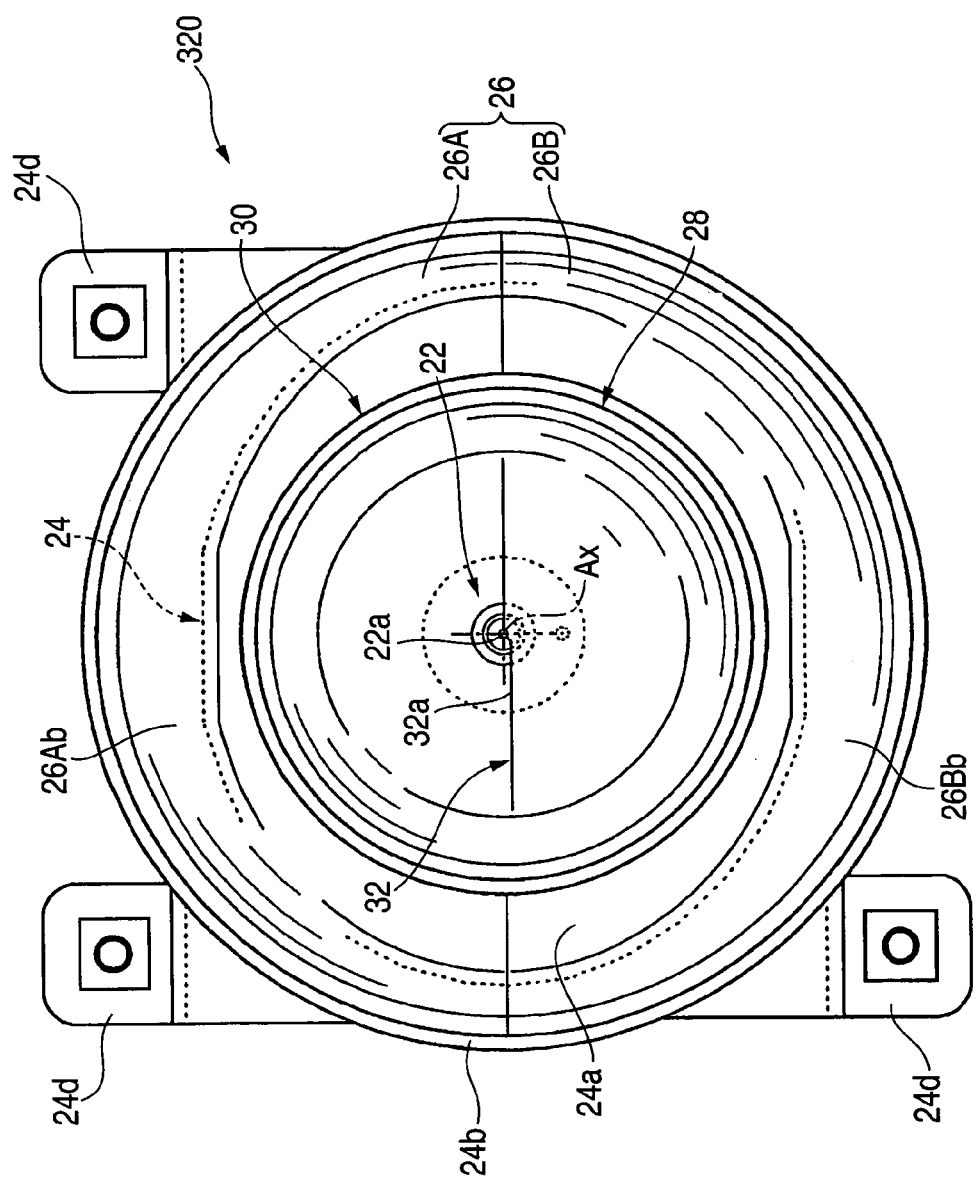
FIG. 12 is a front view showing the lamp unit shown in FIG. 11 as a single article, according to the fourth exemplary, non-limiting embodiment of the present invention.

Next, a fourth exemplary, non-limiting embodiment of the present invention will be described. FIG. 11 is a side cross-sectional view showing a lamp unit 320 of a vehicle headlamp according to the fourth embodiment as a single article. FIG. 12 is a front view showing the same.

The lamp unit 320 has a basic structure analogous to that of the second embodiment. However, the configuration of the annular lens 26 differs from that of the second embodiment.

More specifically, the annular lens 26 of the fourth embodiment is divided into two halves consisting of an upper half section 26A and a lower half section 26B.

The surface shape of a back surface 26Aa of the upper half section 26A of the annular lens 26 is formed into a spherical surface having its center at a point A located ahead and in the vicinity of the light source 22a. In contrast, the surface shape of a back surface 26Ba of the lower half section 26B of the annular lens 26 is formed into a spherical surface having its center at a point B located to the rear and in the vicinity of the light source 22a.

In addition, the cross-sectional profile of a front surface 26Ab of the upper half section 26A of the annular lens 26 through the optical axis Ax is formed into a substantially uniform curve over the half circumference of the annular lens 26 corresponding to the upper half thereof, so as to cause virtual direct light from the point A and having reached the front surface 26Ab to exit as parallel light along the optical axis Ax. By virtue of the above configuration, in the upper half section 26A of the annular 26, all the direct light emitted from the light source 22a and having reached the front surface 26Ab is caused to exit as light oriented upward with respect to the optical axis Ax.

In contrast, the cross-sectional profile of a front surface 26Bb of the lower half section 26B of the annular lens 26 through the optical axis Ax is formed into a uniform curve over the half circumference of the annular lens 26 corresponding to the lower half thereof so as to cause virtual direct light from the point B and having reached the front surface 26Bb to exit as parallel light along the optical axis Ax. By virtue of the above configuration, in the lower half section 26B of the annular 26, all the direct light emitted from the light source 22a and having reached the front surface 26Bb is caused to exit as light oriented downward with respect to the optical axis Ax.

Figure 13:
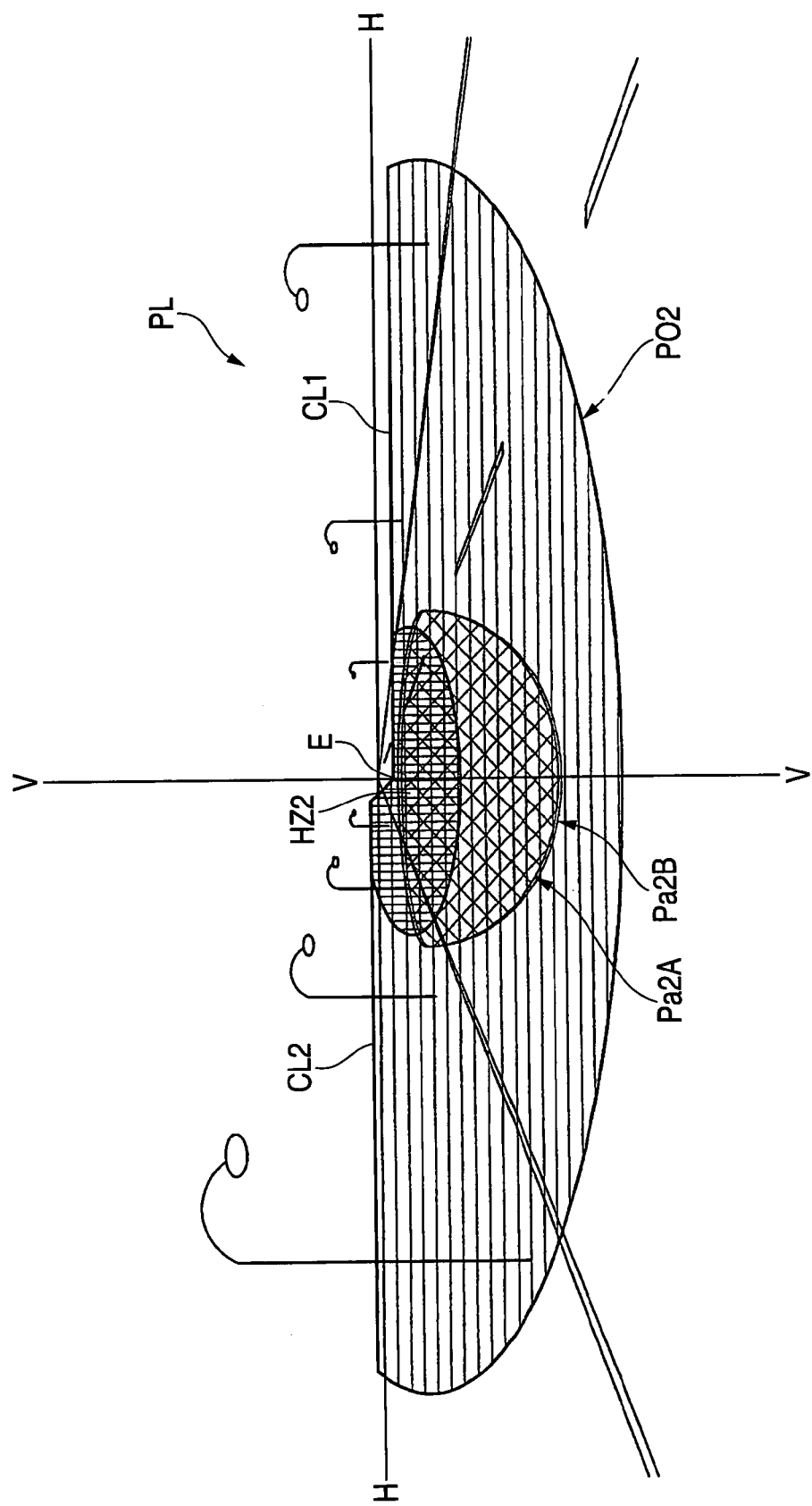
FIG. 13 is a perspective view showing a light distribution pattern formed from light illuminated forward from the lamp unit shown in FIG. 11 on the virtual vertical screen, according to the fourth exemplary, non-limiting embodiment of the present invention.

FIG. 13 is a perspective view showing the low-beam light distribution pattern PL formed from light illuminated forward from the lamp unit 320 of the embodiment on the virtual vertical screen.

The low-beam light distribution pattern PL is analogous to that of the second embodiment with regard to the basic light distribution pattern P02. However, the additional light distribution pattern is formed as a composite light distribution pattern including an additional light distribution pattern Pa2A formed from light having exited from the upper half section 26A of the annular lens 26 and an additional light distribution pattern Pa2B formed from light having exited from the lower half section 26B of the annular lens 26. Each of the additional light distribution patterns Pa2A, Pa2B is formed as a spot-like light distribution pattern which is smaller than the additional light distribution pattern Pa2 of the second embodiment, and reinforces brightness of the hot zone HZ2.

Also when the configuration of the present embodiment is adopted, brightness of the low-beam light distribution pattern PL can be enhanced by adding the additional light distribution patterns Pa2A, Pa2B—formed from light emitted from the light source 22a and having passed through the annular lens 26—to the basic light distribution pattern P02—formed from light illuminated from the light source 22a, reflected from the reflector 24, and having passed through the projection lens 28.

In relation to the above, the surface shape of the back surface of the upper half section 26A of the annular lens 26 is formed into a substantially spherical surface having its center at the point A located ahead and in the vicinity of the light source 22a; and the surface shape of the back surface of the lower half section 26B of the annular lens 26 is formed into a substantially spherical surface having its center at the point B located to the rear and in the vicinity of the light source 22a. Accordingly, all the light having exited from the annular lens can be formed as light oriented downward with respect to the optical axis Ax so as not to extend above the cut-off lines CL1, CL2 of the low-beam light distribution pattern PL. When configured as above, occurrence of glare as a result of providing the annular lens 26 can be substantially prevented.

Furthermore, in the fourth embodiment each of the additional light distribution patterns Pa2A, Pa2B is formed as a spot-like light distribution pattern. Accordingly, brightness of the hot zone HZ2 can be effectively reinforced.

Meanwhile, also in the fourth embodiment, when light diffusion processing is applied to the front surface 26Ab of the upper half section 26A of the annular lens 26 to thus cause light having exited from the annular lens 26 to diffuse, the amount of light exiting therefrom can be made to be uniform between the respective directions. As a result, visibility afforded by the annular lens 26 can be enhanced.

In the fourth embodiment, since the annular lens 26 is divided into two halves consisting of the upper half section 26A and the lower half section 26B, assembly of the annular lens 26 can be facilitated. In addition, even when the annular lens 26 is constituted of the upper half section 26A and the lower half section 26B having different shapes as in the present embodiment, manufacture of the annular lens 26 can be facilitated.

Meanwhile, also in the first, second, and third embodiments, when the annular lens 26 is constituted of two halves consisting of the upper half section and the lower half section, assembly of the annular lens 26 can be facilitated.

Furthermore, as in the respective embodiments, a configuration where the annular lens 26 is disposed at a portion in the circumferential direction of the outer periphery of the projection lens 28 (for example, but not by way of limitation, a configuration where the annular lens 26 is formed from only the upper half section thereof or from only the lower half section of the same) can also be employed instead of the configuration where the annular lens 26 is disposed along the entire outer peripheral edge of the projection lens 28.

While the invention has been described above with reference to the embodiment, the technical range of the invention is not restricted to the range described in the embodiment. It is apparent to the skilled in the art that various changes or improvements can be made in the embodiment. It is apparent from the appended claims that the embodiment thus changed or improved can also be included in the technical range of the invention.

The invention claimed is:

1. A vehicle lamp having a projection lens disposed on an optical axis extending in a longitudinal direction of a vehicle, a light source disposed rear to a rear focal point of the projection lens, and a reflector that reflects light from the light source forward and substantially close to the optical axis, wherein
   an annular lens comprising a peripheral edge portion of a convex-meniscus lens is disposed between the projection lens and the reflector on at least a portion of an outer peripheral edge of the projection lens; and
   a shape of a back surface of the annular lens is substantially spherical having a center in the vicinity of the light source.

2. The vehicle lamp according to claim 1, wherein a cross-sectional profile of a front surface of the annular lens through the optical axis is formed into a substantially uniform curve so as to cause direct light emitted from the light source and having reached the front surface to exit as substantially parallel light along the optical axis.

3. The vehicle lamp according to claim 1, further comprising a shade that shields some of light reflected from the reflector, wherein said shade is disposed in the vicinity of the rear focal point such that an upper edge of the shade is positioned in the vicinity of the optical axis.

4. The vehicle lamp according to claim 3, wherein the cross-sectional profile of the front surface of the annular lens through the optical axis is a curve whose shape varies depending on a circumferential position on the annular lens so as to cause direct light emitted from the light source and having reached the front surface to exit as light oriented downward with respect to the optical axis.

5. The vehicle lamp according to claim 3, wherein
   a shape of a back surface of an upper half section of the annular lens is formed into a substantially spherical surface having its center ahead and in the vicinity of the light source; and
   a shape of a back surface of a lower half section of the annular lens is formed into a substantially spherical surface having its center to the rear and in the vicinity of the light source.

6. The vehicle lamp according to claim 4, further comprising an upward-illuminating lens section that causes direct light from the light source to exit as light oriented upward with respect to the optical axis, wherein said upward-illuminating lens section is formed on an upper portion of the projection lens.

7. The vehicle lamp according to claim 1, wherein the annular lens is split into two halves comprising an upper half section and a lower half section.

8. The vehicle lamp of claim 1, further comprising a clear or translucent cover positioned forward of said projection lens.

9. The vehicle lamp of claim 1, wherein said vehicle lamp is a projector type lamp configured to illuminate light to form a high-beam light distribution pattern.

10. The vehicle lamp of claim 1, wherein said light source is a discharge lamp.

11. The vehicle lamp of claim 3, wherein said shade is formed integrally with a holder.

12. The vehicle lamp of claim 6, wherein said upward-illuminating lens section is a partial notch having a wedge shape.

* * * * *